MECHANICAL VIBRATOR WITH ELECTROSTRICTIVE EXCITATION

Original Filed May 19, 1964

INVENTOR.
KARL TRAUB

BY Hill, Sherman, Meroni, Gross & Simpson
ATTORNEYS

MECHANICAL VIBRATOR WITH ELECTROSTRICTIVE EXCITATION

Original Filed May 19, 1964

INVENTOR.
KARL TRAUB

BY Hill, Sherman, Meroni, Gross + Simpson
ATTORNEYS

MECHANICAL VIBRATOR WITH ELECTROSTRICTIVE EXCITATION

Original Filed May 19, 1964

INVENTOR.
KARL TRAUB

BY Hill, Sherman, Meroni, Gross & Simpson ATTORNEYS

United States Patent Office 3,486,136
Patented Dec. 23, 1969

3,486,136
MECHANICAL VIBRATOR WITH ELECTROSTRICTIVE EXCITATION

Karl Traub, Munich, Germany, assignor to Siemens Aktiengesellschaft, a corporation of Germany Original application May 19, 1964, Ser. No. 368,717, now Patent No. 3,376,521, dated Apr. 2, 1968. Divided and this application Mar. 29, 1968, Ser. No. 717,325
Int. Cl. H03h 7/10
U.S. Cl. 333—71 7 Claims

ABSTRACT OF THE DISCLOSURE

An electromechanical filter having blocks of electrostrictive material along the length of an elongated metallic vibrator, the blocks being arranged with their planes extending perpendicular to the longitudinal axis of the metallic resonator and polarized in the direction of the longitudinal axis of the resonator whereby the harmonics of the vibrations may be filtered.

This application is a division of my copending application Ser. No. 368,717, filed May 19, 1964.

The invention relates to a mechanical vibrator which is formed by small plates or blocks of electrostrictive material for the transition from electrical oscillations to mechanical bending or longitudinal vibrations and vice versa, and is preferably provided as an end vibrator of a multi-part mechanical filter, in which the blocks of electrostrictive material are specifically arranged within an area limited by two vibration nodes which plane of the block extending perpendicular to the longitudinal axis of the vibrator.

Mechanical resonators, due to their high frequency stability and their high quality, can be used to advantage in oscillator circuits and filter circuits in which the requirements with respect to frequency precision or steepness of the filter flanks can be fulfilled, only with difficulty, with lumped circuit elements. A mechanical resonator has, as a rule, the form of an acoustic conduction line in which there holds for it only in a relatively narrow frequency range the electric equivalent circuit diagram representing a resonant circuit. If a mechanical resonator is to be utilized for a large frequency range, its input resistance, in contrast to a resonant circuit from lumped circuit elements, shows continuously repeating null and pole points which are evoked by the so-called harmonic of the resonator. For this reason, for example, in a band pass filter utilizing mechanical vibrators, in addition to the desired pass range other interfering pass ranges occur, which then have to be eliminated by an additional expenditure in coils and condensers. If a mechanical resonator is operated on a harmonic rather than on the fundamental, in order with productionally feasible dimensions to achieve higher resonance frequencies, the relative distance to the next harmonic is diminished. The nearer the first harmonic lies to the desired pass range, and the greater the demands on the blocking attenuation, the more narrow banded must be the electrical resonant circuits utilized for the suppression of the undesired pass ranges, which situation, however, has as a consequence an increase of the pass attenuation in the pass range. Similar difficulties exist when a mechanical resonator is to be used in an oscillator circuit which has no other element. In this case, the oscillator, under some circumstances, can swing to an undesired over wave of higher frequency of the resonator. In slender longitudinal virbrators such over wave frequencies occur, as is well known, harmonically, that is at whole multiples of the fundamental, while in bending vibrators with free ends, they are not disposed harmonically to the fundamental.

It is the object of the invention to eliminate the above described difficulties in a relatively simple manner. Among other things, it is to be achieved, that in electrostrictively excited vibrators, through a suitable arrangement of the excitation systems a series of harmonics is rendered unobjectionable.

Proceeding from a mechanical vibrator which is formed by small plates or blocks of electrostrictive material for the transition from electric vibrations to mechanical bending or longitudinal vibrations and vice versa and is preferably provided as an end vibrator of a multi-part mechanical filter, and in which the blocks of electrostrictive material are arranged predominantly substantially within the space extending between two vibration nodes, with the block plane lying perpendicular to the longitudinal axis of the vibrator, such problem is solved according to the invention, by an arrangement such that the plates or blocks of electrostrictive material are located at points of the vibrator at which no deformation occurs in the harmonic to be suppressed and/or that several blocks are so located at different points of the vibrator that the forces effective in the vibration excitation very nearly completely cancel each other out for the harmonics to be suppressed.

It is advantageous if the blocks of electrostrictive material are arranged in the central portion of the vibrator, or if such blocks are arranged symmetrically to the center of the vibrator.

Advantageous forms of construction can further be achieved if the blocks of electrostrictive material are arranged symmetrically to the center of the vibrator in vibration nodes of odd numbered harmonics, or if the blocks of electrostrictive material are mounted at least approximately symmetrically to vibration nodes of harmonics of higher order.

For the excitation of bending vibrations it is favorable if the blocks of electrostrictive material are interrupted adjacent the neutral axis with respect to bending vibrations, and if the blocks disposed on both sides of the neutral point are oppositely polarized, or if the blocks of electrostrictive material are subdivided by a metal coating, preferably a silver coating, which runs parallel to the limit surfaces established through length and width of the blocks and if these conducting layers are provided with connecting wires.

In the drawings, wherein like reference characters indicate like or corresponding parts:

FIG. 14 is a graph, similar to FIGS. 1–5, of deformation vibrations in a longitudinally vibrating bar for a fundamental frequency and certain harmonics; and FIG. 15 illustrates a mechanical longitudinal vibrator constructed in accordance with the invention.

From the differential equation of a bending vibrator, free at both ends, there can be computed, through consideration of the suitable initial conditions, the resonance frequencies of such a bending vibrator according to the following approximation formula:

$$f_n=\frac{n}{2}(0.5+n)^2\sqrt{\frac{E\cdot J}{ml}}$$

Figure 1:
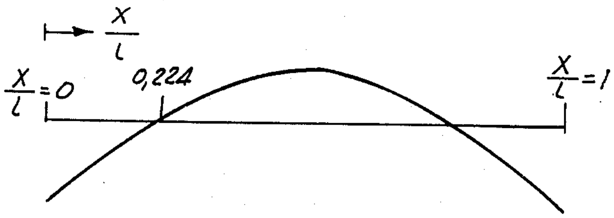
FIGS. 1 to 5 are graphs of deformation vibrations in a bending vibrating bar for a fundamental frequency and certain harmonics.

E here signifies the elasticity modulus of the vibrator material, J the moment of inertia of the bar in the vibrational direction, $m$ the mass per unit of length, $l$ the length of the bar and $n$ the order number of the resonance frequency ($n$=1, 2, 3 . . .). In FIGS. 1 to 5, the deformation and the position of the vibration nodes are plotted in dependence on a coordinate $x/l$, with $x$ signifying an arbitrary point on the bar. These results can be derived from the same differential equation as the resonance condition. FIG. 1 illustrates the deformation and the position of the vibration nodes for the fundamental, FIG. 2 for the second harmonic, etc., and in FIG. 5 the corresponding deformation and position of the vibration nodes for the fifth harmonic. (The order number 1 is allocated to the fundamental so that fundamental and first harmonic are identical. It will be noted from FIGS. 1 to 5 that there occurs in all even numbered overwaves in the middle of the bar ($x/l$=0.5) a vibration on node at which the bending moment is zero. At two places symmetrical to the middle of the bar there occur equally large, but oppositely directed deformations. In the fundamental and the odd numbered overwaves there is a maximum of deformation in the midddle of the bar and at two places symmetrical to the middle of the bar there occur equal sized and like directed deformations.

Figure 6:
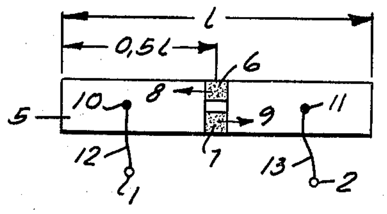
FIG. 6 illustrates a mechanical bending vibrator constructed in accordance with the invention.

FIG. 6 illustrates a mechanical bending vibrator, which is constructed, as to the manner of excitation of the mechanical bending vibrations, in a known manner by means of electrostrictive ceramic blocks. A steel bar 5 is provided, at both sides of the point which is neutral with respect to bending vibrations, with electrostrictively active blocks 6 and 7. As electrostrictively active material lead ceramic (lead zirconate) is used, such, as is known, for example, under the trade name "PZT 6" of the Clevite firm. The ceramic blocks are provided on the sides facing the steel portions with a silver coating and are firmly soldered to such steel portions. The polarization of the ceramic plates is indicated by the arrows 8 and 9 and is so selected that the block 6, disposed above the neutral axis, is oppositely polarized to the block 7 lying below the neutral axis. In the vibration nodes 10 and 11 of the fundamental, metal lead wires 12 and 13 are attached, which extend to corresponding connecting terminals 1 and 2. The lead wires 12 and 13, if of corresponding thick structure, can also be utilized for supporting the vibrator in a casing (not illustrated).

On applying an alternating potential to terminals 1 and 2, for example, the polarization direction of the ceramic block 6 is opposed to the electric field direction, while the polarization direction of block 7 corresponds with the direction of the electric field. Corresponding to this condition, the one block expands itself under the influence of the electric field, while the other block contracts, whereby the vibrator is bent to one side. If the polarity of the applied alternating potential is reversed, then correspondingly the vibrator is bent to the other side, so that it executes pronounced bending vibrations if the frequency of the applied alternating potential agrees at least approximately with its own characteristic frequency. In FIG. 6 the ceramic blocks are mounted in the middle of the bar (that is, at 0.5 $l$).

Figure 7:
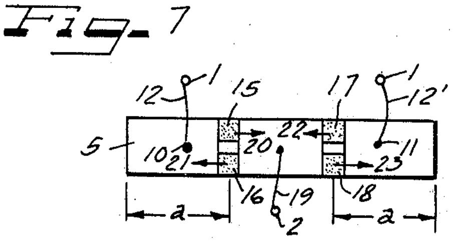
FIGS. 7 and 8 illustrate additional embodiments of the invention.

In the example of the invention illustrated in FIG. 7, the electrostricitvely active systems are arranged symmetrical to the center of the bar and to the portions of the steel vibrator 5 there are soldered ceramic blocks 15, 16, 17, and 18. In the vibration nodes 10 and 11 for the fundamental there are attached lead wires 12 and 12', which extend to a common connecting terminal 1. In the middle portion of the steel bar there is attached an additional lead wire 19, which extends to a connecting terminal 2. The polarization of the ceramic blocks is indicated by the arrows 20, 21, 22, and 23, and again is so selected that the blocks lying above the neutral axis are polarized oppositely to the blocks lying below the neutral axis, with the polarization directions of the two systems being opposed to each other. In this embodiment the vibrator executes mechanical bending vibrations when an electric alternating potential is applied to the terminals 1 and 2, whose frequency agrees with its resonance frequency.

Figure 9:
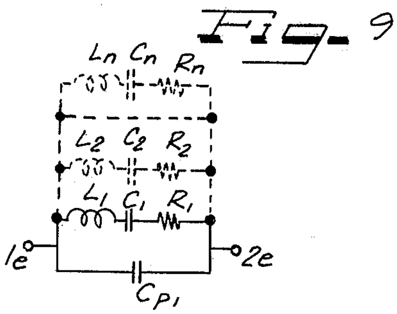
FIG. 9 illustrates the electrical equivalent circuit of the construction illustrated in FIG. 6.

In FIG. 9 there is depicted the electrical equivalent circuit diagram of such bending vibrators. The fundamental can be represented by a series resonance circuit including inductance $L_1$, the capacity $C_1$ and a loss resistance $R_1$, with a capitance $C_{p1}$ being connected in parallel with such series circuit. For agreement with the mechanical vibrators, the connecting terminals are designated $1_e$ and $2_e$. For the possible harmonics occurring on the mehanical vibrators there are indicated, in broken lines, in the equivalent circuit diagram additional series vibration circuits with the circuit elements $L_2$, $C_2$ and $R_2$ to $L_n$, $C_n$ and $R_n$.

Figure 2:
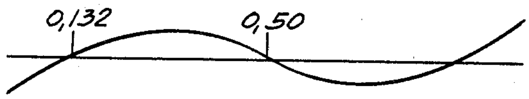
Figure 3:
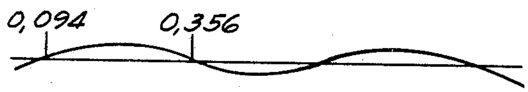
Figure 4:
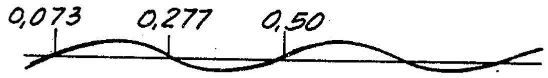
Figure 5:
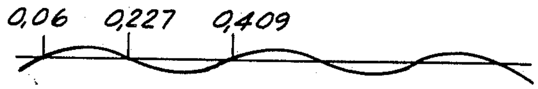

In the embodiments of the invention illustrated in FIGS. 6 and 7 none of the even numbered harmonics is excited, as will be apparent from a comparison with FIGS. 2 and 4. Since all the even numbered harmonics have vibration nodes in the middle of the bar according to FIG. 6 ($x/l$=0.5). In an excitation according to FIG. 7, by reason of the polarization indicated by arrows 20 to 23, the forces for the fundamental are promoted. If in the example of execution of FIG. 7 the distance $a$ of the electrostrictive block from the end of the bar is so selected that the exciting block 15 and 16 or 17 and 18 lie in the vibration nodes of an odd numbered harmonic, this too is then suppressed. For $a$=0/356.1 there results therefore a suppression of the third and of all even numbered harmonics, whereby after the fundamental, the fifth hamonic will be the next that can be excited. It is thereby possible to achieve the next harmonic by a frequency separation generally sufficient for practical purposes. In the equivalent circuit diagram of FIG. 9, therefore, there are eliminated the circuit elements $L_3$, $C_3$, and $R_3$, as well as all the even numbered circuit elements.

Figure 8:
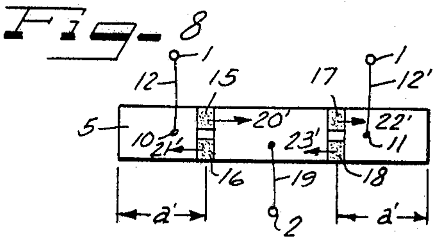

The embodiment illustrated in FIG. 8 corresponds in its construction to that of FIG. 7, the only difference being in the selection of polarization direction for the individual electrostrictively active blocks 15, 16, 17, and 18. The polarization is indicated by arrows 20', 21', 22', and 23' and is so selected that the blocks lying above the neutral axis are polarized oppositely to the blocks lying below the neutral axis. However, for both systems the blocks lying above and below the neutral axis are polarized in the same direction. Upon application of an alternating potential to the terminals 1 and 2 the electrostrictively active blocks are subjected to expansions and contractions, so that the vibrator executes bending vibrations in reference to the polarization direction. As is apparent from a comparison with FIGS. 1 to 5, the exciting forces cancel each other out, as a result of the symmetry of the system, for all odd numbered harmonics and for the fundamental, so that these are not excited. If the distance $a'$ is so selected that the ceramic blocks are disposed in vibration nodes of an even numbered harmonic, this likewise is not excited. If, for example, $a'$ is selected so that the ceramic blocks are disposed in the vibration nodes of the fourth harmonic ($a'$=0.277 $l$, see FIG. 4), the resonator then vibrates on the second harmonic and the next vibration does not occur until the sixth harmonic. In the equivalent circuit diagram of FIG. 9, therefore, the circuit elements $L_4$, $C_4$, and $R_4$ as well as all the circuit elements with odd numbers are eliminated.

Figure 10:
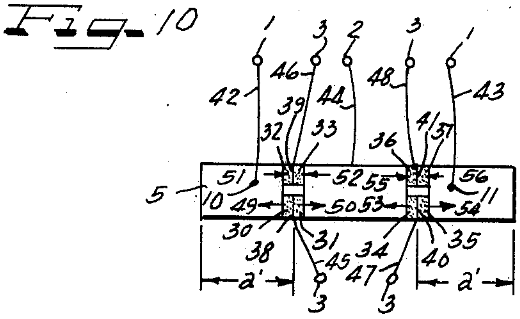
FIG. 10 illustrates an additional modification of the invention.

In FIG. 10 a mechanical bending vibrator is represented, whose excitation takes place over electrostrictively active blocks of calcium-barium-titanate, whose Curie temperature, as is well known, is lower than the requisite soldering temperature. For this reason the electrostrictively acting blocks 30, 31, 32, 33, 34, 35, 36, and 37 are correspondingly subdivided by silver layers 38, 39, 40, and 41. By applying a direct potential to corresponding silver layers and parts the vibrator 5 it is possible then to impress on the ceramic blocks, according to the soldering process, the polarization suited for the particular purpose in use. In the vibration nodes 10 and 11 of the fundamental, lead wires 42 and 43 are attached, which, if suitably proportioned as to thickness, can also serve for the supporting of the vibrator in a casing (not illustrated), and which lead wires are then connected by means of a suitable connecting line to a common connecting terminal 1. Leading from the middle portion of the vibrator 5 is a connecting wire 44, which extends to a connecting terminal 2, and leading from the silver layers 38 to 41 and connecting wires 45, 46, 47, and 48 which extend to a common connecting terminal 3. The polarization direction of the individual ceramic blocks is indicated by the arrows 49 to 56 is made such that the blocks located above the neutral axis are polarized oppositely to the blocks located below the neutral axis. If there is applied to the connecting terminals 1 and 3 an input alternating voltage $U_e$ whose frequency roughly corresponds with the frequency of the bending vibrator, the latter will execute bending vibrations in the rhythm of the applied alternating voltage, since the blocks 32 and 37, for example, lying above the neutral axis expand, while the blocks 30 and 35 lying below the neutral axis contract. If the polarity of the applied alternating voltage is reversed, the blocks lying above the neutral axis contract, while the blocks lying below the neutral axis expand. Through the bending vibration the blocks 31, 33, 34, and 36 are also subjected to expansions and contractions, so that between the silver layers 38 to 41 and the middle portion of the vibrator 5 a voltage appears, which can be obtained as an output alternating voltage $U_a$ across the terminals 2 and 3.

Figure 11:
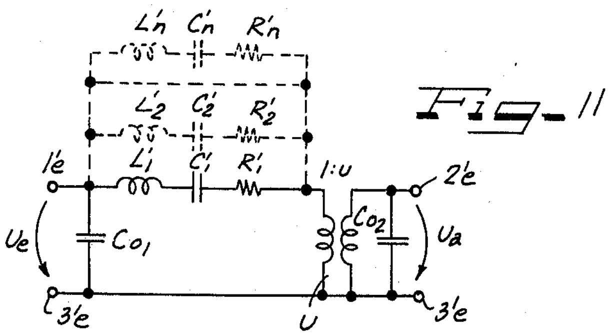
FIG. 11 illustrates an electrical equivalent circuit for the construction illustrated in FIG. 10.

The electrical equivalent circuit diagram of a vibrator according to FIG. 10 is depicted in FIG. 11. It consists, for the fundamental, of a circuit in whose longitudinal branch there is a loss-loaded series resonant circuit with the inductance $L'_{1'}$, the capacitance $C'_1$ and the nonreactive resistance $R'_1$, and in which at the input and output there are approximately equal shunt capacitance $C_{01}$ and $C_{02}$ disposed. In order to take into account a possibly unsymmetrical arrangement, a difference in thickness of the electrostrictive blocks, or a difference in their polarization, there is inserted in the output circuit, ahead of the output cross capacity $C_{02}$, an ideal transformer U with the transformation ratio 1:U. For agreement with the designation of the mechanical vibrators, the connecting terminals, are designated with $1'_e$, $2'_e$, and $3'_e$. In order to take into consideration the harmonics, there are connected in parallel with the series resonant circuit lying in the longitudinal branch, additional series circuits $L'_2$, $C'_2$, $R'_2$ to $L'_n$, $C'_n$, and $R'_n$, indicated in broken lines, with the series resonance circuits corresponding to the order numbers 3 to *n*–1 being indicated merely by a broken line.

If, in the embodiment of FIG. 10, there is applied to the terminals 1 and 3 an input alternating potential $U_e$ the exciting forces for the fundamental are then supported, while as a result of the symmetrical arrangement and the selected polarization, even number harmonics very nearly completely cancel each other (see FIGS. 1 to 5). If the distance *a'* of the ceramic blocks from the vibrator ends is so selected that the ceramic blocks are disposed in the vibration nodes of an odd numbered harmonic, it is not excited. If, for example, there is selected $a'=0.356\ l$, the ceramic blocks are disposed in vibration nodes of the third harmonic, which therefore is not excited. In the equivalent circuit diagram of FIG. 11, all the circuit elements designated with even numbers as well as the series vibratory circuit $L'_3$, $C'_3$, $R'_3$ are then eliminated. A vibrator constructed according to FIG. 10, whose fundamental resonance frequency lies at about 7 kc., delivers at approximately between 9 and 65 kc. a blocking attenuation on the order of magnitude of 8 nepers and presents the next attenuation break only at about 72 kc., which corresponds to the fifth harmonic. It can thereby be achieved that the attenuation break following the fundamental occurs only at a tenfold distance from the fundamental frequency.

The embodiment illustrated in FIG. 10 can also be operated, in analogy with the equivalent circuit diagram of FIG. 9, in the manner of a bipole, if the terminals 1 and 2 are connected with each other and the exciting voltage is applied to the terminals 3 and the connecting line between terminals 1 and 2. In this case there results, for example, for the operation of a multi-part filter, an end vibrator in which the third and all even numbered harmonics are not excited. Thereby there is eliminated in the equivalent circuit diagrams of FIG. 9 all the circuit elements with even numbers as well as the series resonance circuit consisting of $L_3$, $C_3$, and $R_3$.

Figure 12:
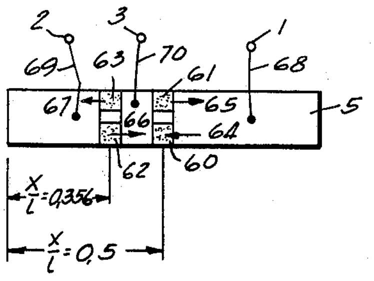
FIGS. 12 and 13 illustrate additional embodiments of the invention in bending vibrators.

In FIG. 12 a mechanical bending vibrator is illustrated, whose excitation systems consist of a lead ceramic. In the middle of vibrator 5 there is disposed ceramic blocks 60 and 61, which are oppositely polarized, as indicated by the arrows 64 and 65. The ceramic blocks 62 and 63 are likewise oppositely polarized, corresponding to the arrow directions 66 and 67, and are positioned in a vibration node for the third harmonic. From the steel parts of vibrator 5, insulated from each other by the ceramic blocks there extend connecting wires 68, 69, and 70 corresponding terminals 1, 2, and 3. This vibrator can likewise be considered with respect to the equivalent circuit of FIG. 11. If an alternating potential is applied to terminals 1 and 3, none of the even numbered harmonics will be excited, since the exciting blocks 60 and 61 are located in the middle of the bar ($x/1=0.5$). Between terminals 2 and 3 an output alternating potential can be obtained which does not contain the voltages corresponding to the third harmonic. In this example of the invention, therefore, the third and all even-numbered harmonics are suppressed.

Figure 13:
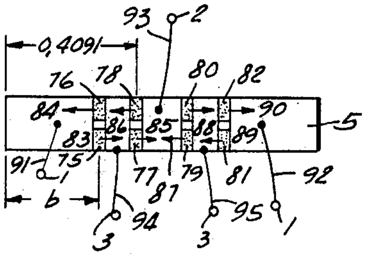

In FIG. 13, in further development of the concept of the invention, there is represented a mechanical bending vibrator operated as a quadrupole, in which the third and fifth harmonics as well as all the even numbered harmonics are suppressed. The steel portions of the vibrator 5 are here connected with each other over respective pairs of blocks 75 and 76, 77, 79 and 80, 81 and 82 of a lead ceramic, the polarization of the individual blocks being indicated by the arrows 83 to 90 and so selected that in each case the blocks located above the neutral axis are polarized oppositely to the blocks located below the neutral axis, and moreover, the blocks located in the left-hand half of the bar are polarized oppositely to the blocks located in the right-hand half of the bar. The blocks 75 and 76 and also the blocks 81 and 82 are so arranged that they are positioned in vibration nodes of the third harmonic ($b=0.356\cdot l$). Blocks 77, 78, 79, and 80 lie in vibration nodes of the fifth harmonic ($x/l=0.409$). From the individual steel portions of the vibrator extend connecting wires 91 and 92 to a terminal 1, a connecting wire 93 to a terminal 2, and connecting wires 94 and 95 to a terminal 3.

The equivalent circuit diagram of this vibrator likewise can be considered with respect to FIG. 11. If there is applied between terminals 1 and 3 an input alternating potential $U_e$ by reason of the excitation system consisting of the blocks 75, 76, 81 and 82, the vibrator then executes bending vibrations, through which the blocks 77 and 78, as well as the blocks 79 and 80 are expanded and contracted. It is possible, therefore, to obtain between terminals 2 and 3 an output alternating voltage $U_a$. Since the blocks forming the excitation system are located in the vibration nodes of the third harmonic, the latter is not excited, and as the output voltage is derived over ceramic blocks which are positioned in vibration nodes of the fifth harmonic, frequencies corresponding to this harmonic are not contained in the output voltage. Moreover, as a result of the symmetry of the arrangement, no even numbered harmonics are even initially excited.

If, in the embodiment of FIG. 13, the distance *b* of the blocks 75 and 76 and of the blocks 81 and 82 from the respective vibrator ends are so selected that these blocks are arranged in vibration nodes of the fifth harmonic ($b=0.277 \cdot l$), the electrostrictively active systems are disposed symmetrically to the center of the vibrator and at least approximately symmetrically to the vibration nodes of the third harmonic. The longitudinal symmetry occurring with reference to the vibration of the third harmonic can be compensated with respect to the electrical operation, by suitable selection of the thickness of the plates 75 and 76 and 81 and 82 whereby they differ from the thickness of plates 77 and 78, and 79 and 80, respectively. Furthermore, if the terminals 1 and 2 are connected and the exciting voltage is applied to terminal 3 and the connecting line of terminals 1 and 2, an end vibration is produced for the operation of a multi-part filter, in which no excitation takes place of the third, fifth and all even numbered harmonics. The suppression of the even numbered harmonics is achieved by the symmetry with respect to the bar center; the suppression of the third harmonic results from the symmetry of the blocks with respect to the vibration nodes of the third harmonic, while the fifth harmonic is not excited, since the blocks are disposed in its vibration nodes. In the equivalent circuit diagram of FIG. 9 there are then eliminated all the elements with even numbers and the series resonance circuits representing the third and fifth harmonics.

In the bending vibrators illustrated in FIGS. 6 to 13, moreover, as a result of the symmetry to the neutral axis and the opposite polarization directions in each case, no longitudinal vibrations can be excited.

I claim:

1. An electomechanical filter having an elongated metallic vibrator for the transition of electrical oscillations to bending vibrations, blocks of electrostrictive material disposed along the length of the metallic vibrator, said blocks of electrostrictive material extending perpendicular to the longitudinal axis of said vibrator, and wherein at least one of said blocks is disposed at a vibration node of an undesired harmonic of a fundamental being excited thereby.

2. An electromechanical filter in accordance with claim 1 wherein said electrostrictive blocks are placed along the neutral axis with respect to the bending vibration and being subdivided into a pair of blocks, said pair of blocks being located above and below the neutral axis, said blocks above the neutral axis being oppositely polarized with respect to said blocks below the neutral axis.

3. An electromechanical filter as recited in claim 2 wherein said blocks of electrostrictive material are subdivided into pairs of blocks along the neutral axis with respect to the bending vibration, and said blocks above the neutral axis being of like polarity with respect to the bisection plane that extends perpendicularly to the longitudinal axis of said vibrator.

4. An electromechanical filter as recited in claim 2 wherein said blocks of electrostrictive material are subdivided into pairs of blocks along the neutral axis with respect to the bending vibrations, and said blocks above the neutral axis being oppositely polarized with respect to the bisection plane extending perpendicularly to the longitudinal axis of said vibrator.

5. An electromechanical filter as recited in claim 4 wherein a metallic coating is provided to subdivide said blocks of electrostrictive material, said coating being preferably of silver and extending perpendicularly to the longitudinal axis of the vibrator.

6. An electromechanical filter as recited in claim 1 wherein said blocks of electrostrictive material are located at vibration nodes of the odd-numbered harmonics.

7. An electromechanical filter as recited in claim 1 wherein one of said blocks excites said vibrator, and a second block suppresses vibrations of said vibrator.

No references cited.

ROY LAKE, Primary Examiner

D. R. HOSTETTER, Assistant Examiner

U.S. Cl. X.R.

310—8.6, 9.8, 8.2